United States Patent [19]

Woodward

[11] Patent Number: 4,844,241
[45] Date of Patent: Jul. 4, 1989

[54] CONVEYOR STUB IDLER ROLL APPARATUS

[76] Inventor: William S. Woodward, 3261 Bitters Ct., Green Bay, Wis. 54301

[21] Appl. No.: 110,689

[22] Filed: Oct. 20, 1987

[51] Int. Cl.$^4$ .............................................. B65G 45/02
[52] U.S. Cl. .................................. 198/500; 198/821; 198/829; 198/842
[58] Field of Search ...................... 198/500, 501, 690.2, 198/699, 820, 821, 829, 840, 842; 184/12; 193/37; 384/474

[56] References Cited

U.S. PATENT DOCUMENTS

| | | | |
|---|---|---|---|
| 1,577,725 | 3/1926 | Jones | 198/842 |
| 1,676,894 | 7/1928 | Frank | 384/474 |

FOREIGN PATENT DOCUMENTS

| | | | |
|---|---|---|---|
| 729983 | 3/1966 | Canada | 198/821 |
| 520737 | 4/1957 | Italy | 384/474 |
| 1239372 | 7/1971 | United Kingdom | 198/820 |

Primary Examiner—Joseph E. Valenza
Attorney, Agent, or Firm—Andrus, Sceales, Starke & Sawall

[57] ABSTRACT

Stub idler roll units for flexible sidewall belt conveyors are mounted to support the return run of a sidewall belt. The stub idler roll unit includes a stub roll fixed to and forming an integral part of a support shaft. The shaft extends from the roll and is journaled in a pair of relubricable, sealed bearings, secured with a tubular bracket having a mounting plate for mounting of a roll unit to the conveyor. A tubular bearing housing is secured within the bracket and has end recesses to receive a bearing and end washer. The outer end of the shaft is threaded and the shaft and roll is clamped to the housing by jam nuts on the outer end of the shaft, the washer abuts the housing to take the clamping load and insure adequate operating clearances. The shaft has an axial passageway extending from the outer end of the shaft and provided with a lubricating fitting. Internally, the shaft passageway has an offset extension to a chamber between the bearings for supplying lubricant to the bearings with a low pressure grease gun. The bracket has a mounting plate with laterial slots for positioning the roll with respect to the belt sidewalls.

10 Claims, 1 Drawing Sheet

U.S. Patent
Jul. 4, 1989
4,844,241
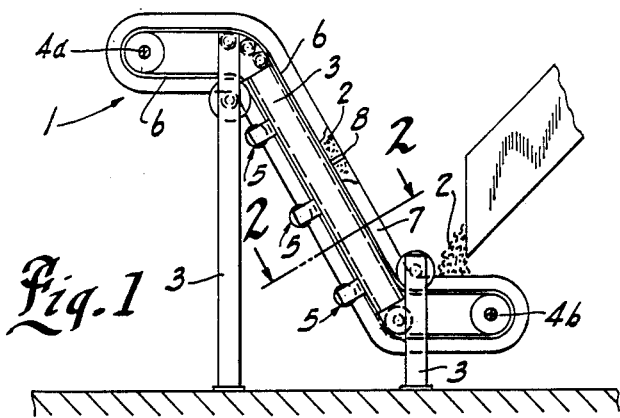
Fig. 1
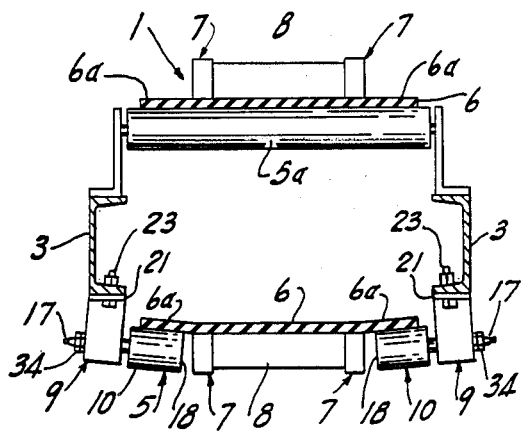
Fig. 2
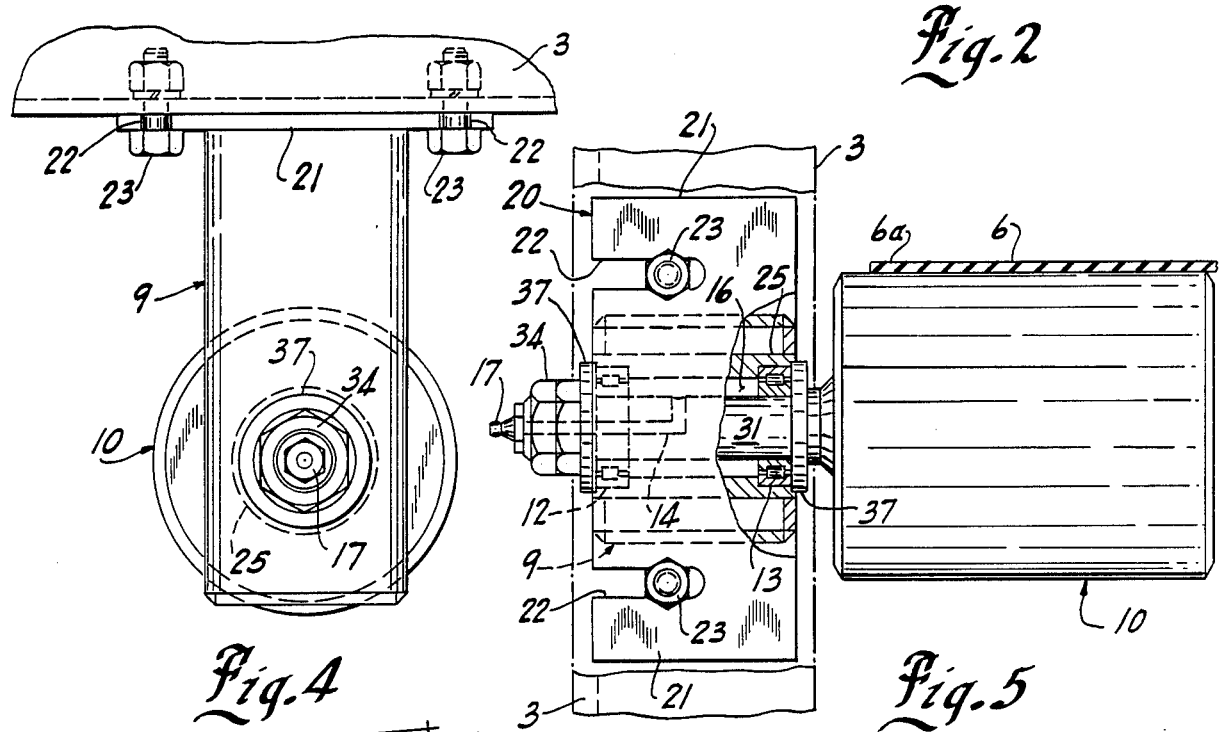
Fig. 4
Fig. 5
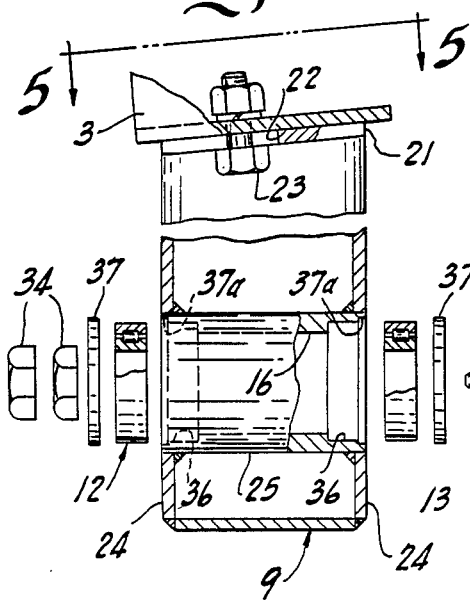
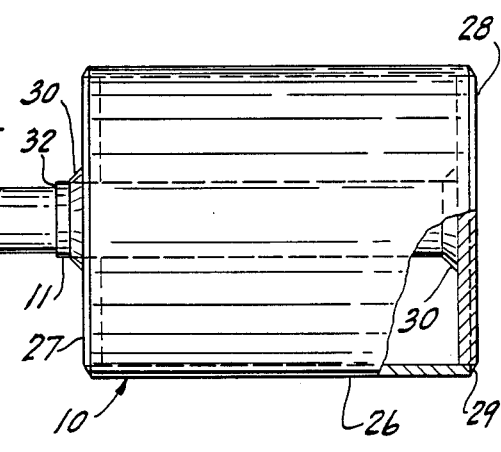
Fig. 3

CONVEYOR STUB IDLER ROLL APPARATUS

BACKGROUND OF THE PRESENT INVENTION

This invention relates to a conveyor stub idler roll apparatus and particularly to a stub roll for edge support of the return run of an endless flexible sidewall conveyor belt handling particulate matter.

The movement of industrial products in the form of particulate and fibrous materials has for years been conveniently done with trough-type belt conveyors operating horizontally or at inclines to 20 degrees. The conveyor consists of a middle support structure with two or three roll inclined rollers (idlers) located every four to five feet along the top or "carrying side" of the frame in order to form the belt into a trough. Although the trough shaped belt structure provides a substantial confinement of the material, there is some movement of the material from the belt, particularly in inclined attitudes, caused by the belt as it impacts on the individual idler rolls. The operating environment of these conveyors range from clean environments such as food plant installations to extremely dirty environments such as foundries, coal handling systems, paper mills and the like. The majority of these conveyors are located outside and are virtually unprotected from the elements.

Belt speeds range from 150 Ft./min. to 500 Ft./min, and faster, which subjects the idler bearings and drive system to relatively severe operating conditions. Idler bearings must be periodically lubricated in order to insure that the rollers turn and prevent belt damage. Of equal importance, however, the lubricant is required to purge the bearing seals of foreign matter caused by the congealing of the grease as it cools when the conveyor is shut down, drawing in the dirt to the bearing surfaces.

In 1968, a new type of conveyor belt was introduced to the public, incorporating a flat belt with corrugated sidewalls and cleats secured to the top of the belt, which formed pockets in the conveyor belt. With this design, conveyors were now capable of running horizontally, turning up at steep angles (to 90 degrees or vertical) then turning once more to the horizontal position to discharge. These belts were supported by flat idlers on the carrying side because flexible sidewall belting is designed with a transverse truss ply so that it cannot trough. This is essential to the belts ability to be able to be formed into an "L" or "Z" shaped conveyor. Likewise, conventional flat idlers on the carrying side and conventional flat return rolls running on the flexible sidewalls were employed on the return side.

After a number of years of using the conventional style return roll for this type of belt, it became apparent that the conventional return roll caused excessive wear to sidewalls which led to cracking, belt mis-alignment, and premature failure. In the early 1980's, stub idlers were introduced for use in place of the return roll. These stub idlers were cantilevered rollers which run on the outboard extension of the base belt, thereby allowing the sidewalls to hang free on the return side of the belt. However, all of these units were manufactured in the same way as the conventional return idler with the bearings mounted in the roller. Because of the added load due to the cantilevered design, the shafts could not be drilled in order to afford a channel for the lubrication of the bearings. Consequently, all of the idlers were provided as "sealed for life". In addition, the standard support bracket was used, which provides no lateral adjustment in order to maintain the proper gap between the sidewall and the end of the roller, which is necessary to prevent sidewall wear and damage.

Various prior art variations of this structure are used in industry and variations are shown in the prior art. For example, reference may be made to any of the following U.S. issued patents:

| U.S. Pat. No. | Issue Date | Inventor |
| --- | --- | --- |
| 1,062,325 | 05-20-1913 | Dierdorff |
| 1,924,807 | 08-29-1933 | Sayers |
| 3,207,291 | 09-21-1965 | Barnish |
| 3,334,727 | 08-08-1967 | Rieser |
| 3,420,590 | 01-07-1969 | Bilocq |
| 3,604,766 | 08-14-1969 | Bankauf |
| 4,438,617 | 03-27-1984 | Ulrich et al |

However, the above patents generally disclose idlers designed for the troughing or "carrying side" of the belt and/or attachments to the carrying side idler to prevent mis-alignment.

Notwithstanding, the significant development in the art and the different rollers commercially available, the standard stub roller for the return run of the sidewall belt continues to be a significant maintenance problem and cost. This is particularly significant because idler failure causes the shutdown of the conveyor (and the costly loss of product processing) as well as damage to the expensing belt itself. There is, therefore, a continuing demand for an improved idler roll design in the area of stub idlers for the rapidly expanding field of flexible sidewall conveyor belt applications.

SUMMARY OF THE PRESENT INVENTION

The present invention is particularly directed to a conveyor stub idler unit for flexible sidewall belt conveyors, in which bearings have been moved from the roll and mounted in the support bracket, thereby allowing for the use of a larger diameter solid shaft in order to handle the high cantilevered loads. The shaft is journaled down outside of the roller to accommodate the standard generally accepted roller bearing sizes used throughout the idler industry. Because the shaft portion which is mounted in the support bracket is subjected to much lower loads, it can be drilled to accommodate a re-lubrication system.

The present invention consists of a stub roll and supporting bracket. A roll member is fixed to and forms an integral part of the shaft. The shaft extends from the roll to a mounting bracket. Re-lubricable, sealed bearings are secured within the bracket and support the roll shaft for rotation. The shaft is formed with an axial passageway extending from the outer end of the shaft and provided with a lubricating fitting. Internally, the shaft passageway is coupled through an appropriate offset extension to a chamber between the axially spaced roller bearings to permit the periodic supply of fresh lubricant, which is fed between the bearings so that it forces the dirty grease to the outside through the seal elements. The seal elements are provided with a passageway to prevent pressure build-up in the lubricant chamber. This design permits the use of a low pressure grease gun minimizing potential damage to the bearings. The externally mounted fitting permits re-lubrication while the conveyor is in operation. In addition, the mounting bracket is provided with lateral slots to permit the appropriate positioning of the roll with respect to the belt sidewalls, for optimum operating clearance and maximum belt support. The mounting bracket is a tubular member which is closed at the opposite ends to minimize entrance of foreign matter.

Experience has also shown that rather than mounting the stub idlers in a horizontal position, there is a better fit between the belt and the idler if it is declined at approximately 5 degrees, which accommodates the natural flexibility of the rubber, even though the belt is constructed with a cross rigid truss ply. This declined attitude also helps the belt to track better and center itself between the horizontal members of the conveyor frame. The bracket is attached to the mounting plate to establish the desired decline of the stub idler rolls.

The present invention provides a relatively simple construction with the rigid support of the roll on the shaft, the internally mounted bearings in the support, and the internal re-lubrication system. The structure of the invention can be formed using commercially available components, commonly accepted idler bearing sizes, and readily understood fabrication technology.

BRIEF DESCRIPTION OF THE DRAWINGS

The drawings furnished herewith generally illustrate the best mode presently contemplated for the invention and is described herewith.

In the drawings:

FIG. 1 is a side view of a conveyor for conveying of fibrous or particulate materials using flexible sidewall belting.

FIG. 2 is a cross section taken generally on line 2—2 of FIG. 1 and showing how stub idler rolls are mounted to the conveyor frame to support the return side of the belting;

FIG. 3 is an exploded view of the belt support stub roll unit illustrated in FIGS. 1 and 2;

FIGS. 4 and 5 are, respective, side and plan views of the belt support stub roll unit.

DESCRIPTION OF THE ILLUSTRATED EMBODIMENT

Referring to the drawings and particularly to FIGS. 1 and 2, the present invention is shown applied to support of an endless flexible sidewall belt 1 of an endless belt conveyor for transport of various products 2 and particularly fibrous, particulate and like products. The conveyor includes the flexible sidewall belt 1 that travels about a supporting structure 3, and is shown as a Z-shaped conveyor. The conveyor sidewall belt 1 is endless and suitably supported at its opposite ends with a drive unit 4 and tail pulleys 4b. The present invention is shown applied to a horizontal inclined horizontal belt structure for lifting and transfer of a particulate type of material 2 from a lower level to a higher level. The belt 1 includes a flat base member 6 having similar sidewalls 7 secured to the opposite edges of the belt base member. Each of the sidewalls 7 is a serpentine type of an element standing on edge and secured to the belt to provide physical support and confining of the material on the belt. Lateral cleats 8 are secured to the belt at longitudinally spaced locations for supporting of the material 2 on the inclined portion of the belt and insuring transport and the upward carrying of the material. Such belts are well known and widely used in industry. The belt structure with the flexible sidewall and cleats provide a relatively significant weight on the recessed portion 6a of the belt.

The intermeditate length of belt 1 in the top or carrying run is supported by a series of spaced flat idler rolls 5a which support the load and maintain a particular path of travel, including various horizontal and/or inclined portions, as shown. The idler roll 5a is a conventional roll mounted in formed bracket, and extends completely across and supports the base member 6. Stub idler roll units 5 are constructed in accordance with this invention are mounted approximately 3 feet along the underside of the belt 1 to physically support the belt on the recessed portions 6a of the belt 1 and to maintain desired location of the belt between the support frame. Each stub idler roll unit 5 is similarly constructed and forms the subject matter of the present invention.

Generally as illustrated, the structure 3 includes a longitudinal supporting frame member extending parallel to and immediately adjacent the outer edge of the belt 1. Each of the roll units 5 is secured to the underside of the frame member 3. The roll unit 5 includes the tubular mounting bracket 9 secured to the underside of the frame. A rotating roll 10 is rigidly affixed to a shaft 11 which extends through the bearings 12 and 13 in the mounting bracket 9. The bracket 9 is shown as a tubular member with spaced bearing units 12 and 13 located in an axially spaced relation within the mounting bracket 9. Bearing units 12 and 13 rotionally support the shaft 11 and roll 10, with the roll located adjacent to the bracket 9. The shaft includes an axial passageway 14 extending inwardly from the outer most end, with the inner end 15 of passageway projecting radially into a chamber 16 between bearing units 12 and 13. The outer end of the passageway 14 includes a grease fitting 17. The bearing units 12 and 13 are thus confined and essentially sealed within the mounting bracket 9. Lubrication of the bearing units 12 and 13 is provided through the externally located fitting 17.

In operation, the tubular bracket 9 is in the form of a post and appropriately located to establish the desired angle of orientation of the roll 10 with respect to the belt structure. The bracket 9 is adjustable to permit precise orientation of the roll 10 to the underside of the belt sidewall 7. In the illustrated embodiment of the invention, this permits precise orientation and location of the end face 18 of the roll 10 with respect to the adjacent belt sidewall 7. In addition and significantly, the bearing units 12 and 13 are located within the tubular bracket, which permits the use of a larger diameter, solid shaft to accept the high cantilevered load of the belt. Likewise, bearing units 12 and 13 are close to the location of the grease fitting 17 and can be properly and/or conveniently lubricated through a short shaft passageway 14.

The stub idler roll unit 5 of the present invention can therefore be readily and accurately installed at the necessary angle with respect to the belt for optimum tracking. The bearings are readily and effectively lubricated. The frequency of lubrication will, of course, vary with the application. The actual operating conditions, as well as the environmental conditions and the materials being transported, will all effect the lubrication requirements. In any event, a periodic lubrication schedule can be readily provided for re-lubrication of the bearings and plugging of the seals as required. As more fully developed herein, the system can be readily lubricated without the necessity of the conventional high pressure lubrication equipment. In fact, a conventional low pressure source such as a volume type grease gun is preferably used to minimize pressurizing of the bearing and seals.

More particularly in the illustrated embodiment of the invention, the support frame member 3 adjacent the belt 1 is shown as a structural channel, and the leg of which defines a planar surface essentially parallel to and generally in the plane of the belt 1. The stub idler bracket 9 is a generally hollow post. A mounting plate 20 is secured to the mounted end of the bracket 9 and extends to both sides as at 21. Each extended portion 21 of the plate 20 is a mounting element and is slotted as at 22 to receive a clamping nut and bolt units 23 which extend through the frame 3 and the slots to rigidly and releasably affix the bracket 9 to the underside of the frame member 3. The slots 22 extend from the side edges of the plate portions 21 and perpendicular to the movement of the belt and sidewalls 7. The slots 22 permit the accurate location of the roll unit 5 and particularly the end wall 18 with relationship to the belt sidewalls 7 in order to insure maximum belt support and proper operating clearance.

The bracket 9 is shown as a substantially square post member. The mounting plate 20 and the bracket 9 are formed with a small angle corresponding to the desired angular orientation of the roll unit 5 and particularly roll 10 beneath the recessed portion 6a of the belt. The mounting plate 20 is bolted or otherwise affixed to the frame 3 to establish a corresponding orientation of the post with respect to the mounting plane.

The square mounting bracket 9 projects outwardly from the frame with a pair of opposed sidewalls 24. The bearing units 12 and 13 are affixed in the bearing tube 25, which, in turn, is affixed in the walls 24 for supporting of the roll 10. The roll 10 is a drum or cylindrical member 26 closed at the opposite ends by end discs 27 and 28. Each end disc 27 and 28 is shown as a similar flat plate member having an inner wall portion projecting into the cylinder 26. The outer diameter of the end disc is just slightly larger than the inner diameter of the cylinder and defines a circumferential offset area within which a weld 29 is deposited to rigidly interconnect the end wall to the cylinder. The weld is formed with a smooth radius to eliminate sharp edges which cause belt damage. The support shaft 11 projects through the roll 10 and is firmly affixed by similar welds to each of the corresponding end disc.

The shaft 11 extends into roll 10 through the outer end disc 27 into abutting engagement with the opposite or inner end disc 28. Circumferential welds 30 rigidly affix the shaft 11 to each of the end disc and thereby to roll 10.

The shaft 11 projects outward from roll 10 a short length to a stepped down bearing portion 31, which also defines a locating shoulder 32. The outer most end of the bearing shaft 11 is threaded as at 33. In assembly, the shaft projects through the post 9, with the shoulder 32 abutting the adjacent the bearing unit 12 and the threaded end 33 extended through bearing unit 13. Two clamping nuts 34 on shaft end 33 abuts unit 13 and secures the roll 10 to post 9.

The bearing unit consists of an outer bearing housing or tube 25 extending through the bracket 9 and rigidly secured within the opposite walls 24 of the bracket 9, as by weldments. The housing 25 is a cylindrical member having outer enlarged end bearing recesses 36. Similar sealed bearing units 12 and 13 are located in each of the recesses. Each of the bearings is preferably a roller bearing having an LM11949L cone and an LM11910 cup, particularly for a 5 inch diameter roll. The same structure may be used for a 6 inch diameter roll with an LM67048L cone and an LM67010 cup. The bearing recesses 36 further include outer stop recesses 36a on the outer ends of the bearing housing 25. Flat end washers 37 fit within the recesses 37a. The opposite outer bearing seals of the bearing units include lips which contact both recess 37a and the washers 37. The washers form a flat outer wall on the outer edge of the bearing housing. In assembly, the inner flat washer 37 abuts the shoulder on the shaft and the jam nuts 34 abuts the outer flat washer 37 to firmly and rigidly clamp the shaft 11 to and within the bearing assembly, thereby establishing the appropriate operating clearance for the closely spaced bearings 12 and 13. The washers 37 also serve to protect the bearing seals from external damage.

The shaft is formed with the generally L-shaped lubricating passageway 14 including the axial portion extending inward from the outermost threaded end. The inner leg 15 of the L-shaped opening extends radially outward essentially in alignment with the center of the bearing housing, and thus, chamber 16 between the bearing units 12 and 13.

The housing 35 has an inner diameter larger than the diameter of the bearing shaft 11 projecting through the housing. The lubrication chamber 16 is thereby formed between the housing, the spaced bearing units 12 and 13 and shaft 11 for containing lubricant. Periodically, fresh lubricant is supplied to maintain the desired lubrication and purge dirt from the seals.

The fitting 17 is adapted to receive a hand operated grease gun or other grease source for introducing of lubrication into the grease chamber between the bearings and thereby provide a reservoir of lubricant for the bearings.

The illustrated embodiment of the invention shows a relatively simple construction and support of the roll 10 in the external mounting post. The external location of the bearing assembly within the closed post structure minimizes the introduction of foreign material into the bearing unit. Significantly, the location of the bearing units to the exterior establishes close location with respect to the grease fitting 17, thereby providing for a larger diameter shaft to accommodate the heavier bending load due to the cantilevered construction, while allowing the use of readily available, standard idler bearings. The short length of passageway 14 particularly permits effective lubrication of the bearing units. Further, the bearing assembly can be lubricated using a low pressure application thereby minimizing any adverse effect resulting from high pressure application to the bearing seals and structure.

The slotted mounting plate of the post 9 facilitates the appropriate adjustment and location of roll 10 with respect to the edge of the belt 3 and any protruding portion such as the confining sidewall 6 in the illustrated embodiment. For example, one belt manufacturer in a illustrated embodiment requires that the idler stub roll be provided for supporting of the belt structure exteriorly of the sidewalls. The belting manufacturer recommends that the innermost end of the roll be spaced from the sidewall by a distance equal to 0.2 times the distance between the outermost edge of the belt and the first edge or surface of the sidewall. The present bearings with the adjustable mounting post permit accurate location of the several stub idler roll units on the supporting structure with respect to the movement of the sidewall and that portion of the conveyor. The shaft can therefore be readily and safely formed with the lubrication passageway in the bearing area and still maintain the required load bearing strength, with a diameter to use standard bearing units.

The re-lubrication which is necessary to establish a long operating life of the stub roller units is of substantial significance. The operator can readily provide the necessary re-lubrication at periodic intervals. The particular length of periods between lubrication will vary with the application and can be readily determined by the operator based on the particular known operating conditions and loads. It is anticipated that under average operating conditions, a factory lubrication will be provided and re-lubricated after approximately 3,000 to 4,000 hours of operation. This will of course vary with various factors, such as, belt, speed, material, characteristics, temperature, humidity, and hours of daily operation, load tensions and the like, placed on the belt and the idler roll unit.

An appropriate grease is used to fill the chamber under a low pressure condition preferably until there is slight purging of the grease through the outer seals of the bearings. The bearing arrangement and, particularly, the close placement to the fittings provide for a desirable low pressure grease application.

The long operating life of the stub idler roll unit is of substantial significance. Thus a very substantial number of such units are required. Any one stalled roll will cause excessive wear on the roll shell and damage to the expensive sidewall belt construction.

Generally, in the construction of the unit, standard duty and heavy duty units may be provided. The design of each unit is essentially the same. The differences are in connection with the particular strength, size, thickness of the component parts, in particular the size of ratings of the bearings provided.

Although particularly adapted to the support of the return of a sidewall conveyor belt, the invention may be used in other environments in which a same and lighter load characteristic arises. For example, the deflection of the conveyor belt is made using deflection wheels on the recessed portion of the belt or by a plurality of spaced stub idler units. The rolls are also preferably mounted with the 5 degrees incline, and the illustrated return stub roll units can therefore be used for such application by reverse assembly of the roll and the post.

The present invention thus provides a cost effective and efficient stub idler roll unit for flexible sidewall conveyors with construction based on use of a existing industry standard idler bearings which simplifiers bearing replacement and minimizes repair parts stock.

Various modes of carrying out the invention are contemplated as being within the scope of the following claims particularly pointing out and distinctly claiming the subject matter which is regarded as the invention.

I claim:

1. A conveyor apparatus including a flat flexible sidewall belt having a central product carrying portion and sidewalls extending upwardly from said product carrying portion and defining side edge portions, comprising a frame structure means for moving the belt across said frame structure, a plurality of edge supporting roll means longitudinally spaced along the length of the belt and engaging only the side edge portion of the underside of the belt and supporting the corresponding side edge portion of the belt, each of said idler roll means comprising an idler roll rigidly affixed to a stub shaft with said shaft projecting axially outward from one end of said roll, a shaft support means located immediately adjacent said roll, said shaft journaled in said bearing means, lubricating means coupled to each of said bearing means and including a lubrication input connector means accessible externally of said roll and accessible with said bearing means in said support means.

2. The conveyor apparatus of claim 1 wherein said shaft support means includes a tubular post having an end mounting plate and a pair of parallel walls extending essentially perpendicularly to said plate, said bearing means being secured to said parallel walls.

3. The conveyor apparatus of claim 1 wherein said belt includes outwardly extending sidewall members to define a generally trough-shaped belt support, each of said idler rolls being a smooth surface cylindrical roll having opposite end closure walls and having said stub shaft rigidly affixed to said end walls and projecting axially outwardly of said roll, said bearing means including a tubular support for said bearing means and defining a lubricant chamber, said shaft having a centrally located passageway extending inwardly from the outermost end thereof and terminating in said lubricant chamber, and said lubricant input connector means being secured to said passageway for selective and periodic supplying lubrication to said bearings.

4. The conveyor apparatus of claim 3 wherein said tubular support is an integral tube having a corresponding bearing recess in each end with said bearing means located in said recess, said recesses have a depth slightly greater than said bearing and having a washer stop recess in the outermost end thereof, washers located within said stop recesses, said bearing means having outer end seals abutting said washers, said shaft having a shoulder abutting the washer adjacent said roll and having a threaded end extending outwardly of said tube, clamping nut means on said threaded end clamping said washers to said tube and sealing said bearing.

5. The conveyor apparatus of claim 1 wherein said shaft support means includes a rectangular tubular support post secured to said frame structure in outwardly spaced relation to the outer edge of said belt and including parallel spaced walls oriented in parallel relationship to the path of said belt, said bearing means secured within said post with a separate bearing secured to the interior side of each of said parallel walls, said bearings being aligned to receive said shaft.

6. The conveyor apparatus of claim 5 wherein said support post including an adjustable mounting plate for relative fixed orientation of said roll relative to said sidewall member, said mounting plate being fixed to said post to support said shaft and roll at an angle to the plane parallel to said belt.

7. A belt conveyor, comprising an elongated substantially flat flexible belt member having outwardly extending sidewall members, a plurality of longitudinally spaced support structures for supporting of the underside of said belt, idler stub roll units secured to said support structure for supporting of the outer edge portions of said belt to define a generally trough-shaped belt support, each of said idler stub roll units including a smooth surface cylindrical roll having opposite end closure walls and a stub shaft rigidly affixed to said end walls and projecting axially outwardly of said roll, a rectangular tubular support post secured to said support structure in outwardly spaced relation to the outer edge of said belt, and including parallel spaced walls oriented in parallel relationship to the path of said belt, sealed bearings secured within said post with a separate bearing secured to the interior side of each of said parallel walls, said bearings being aligned to receive said shaft and rotatably supporting of said shaft, said support post including an adjustable mounting plate for relative fixed orientation of said roll relative to said sidewall member, said mounting plate being fixed to said post to support said shaft and roll at an angle to the plane parallel to said belt, said shaft having a centrally located passageway extending inwardly from the outermost end thereof and terminating between said spaced bearings, and a lubricant input connector secured to said passageway for selective and periodic lubrication of said bearings.

8. A stub idler roll apparatus for supporting a conveyor belt, a support shaft, a roll rigidly affixed to one end of shaft with said shaft projecting axially outwardly from said roll to an outer end, a shaft support means including a mounting housing and a pair of axially spaced support bearing means secured within said housing and including a lubrication chamber means between said bearing means, said shaft journalled in said bearing means and having said roll located immediately adjacent to said housing, and lubricating means coupled to said lubrication chamber means and including a lubrication input means accessible externally of said roll and accessible with said bearing means in said shaft support means.

9. The stub shaft idler roll of claim 7 wherein said housing is a tubular post having an end mounting plate and a pair of parallel walls extending essentially perpendicular to said plate, said bearing means being secured to said parallel walls and including a tubular support secured to said parallel wall and a bearing means in each end of said tubular support, a lubrication passageway in said shaft extending from said outer end and having an offset extension terminating between said bearing means for supplying lubricant to said bearing means.

10. The stub idler roll apparatus of claim 9 wherein said tubular post is an integral tube having a corresponding bearing recess in each parallel wall with said bearing means located in said recesses, said recesses have a depth slightly greater than said bearing and having a washer stop recess in the outermost end thereof, washers located within said stop recesses, said bearing means having outer end seals abutting said washers, said shaft having a shoulder abutting the washer adjacent said roll and having a threaded end extending outwardly of said tube, and clamping nut means on said threaded end clamping said washers to said tube and sealing said bearings.

* * * * *